United States Patent Office 3,640,975
Patented Feb. 8, 1972

---

3,640,975
METHOD OF PROCESSING POWDERY ACCELERATORS PREPARED IN AN AQUEOUS MEDIUM
John W. Bilderback, Akron, Ohio, assignor to The Goodyear Tire & Rubber Company, Akron, Ohio
No Drawing. Filed Feb. 3, 1969, Ser. No. 796,170
Int. Cl. C08c *11/54;* C08f *27/06*
U.S. Cl. 260—79.5                              5 Claims

ABSTRACT OF THE DISCLOSURE

Coagulating a polymer latex during the preparation of a powdery accelerator so as to improve the processibility of the accelerator.

---

This invention relates to a method of improving the processibility of powdery accelerators prepared in an aqueous medium. More particularly it relates to a method of improving the drying rates of powdery accelerators prepared in an aqueous medium, as well as improving the rate of removal of powdery accelerators from aqueous slurries of the accelerator by filtration.

Powdery zinc dialkyl dithiocarbamate accelerators, i.e., those having a fine particle size, used in the sulfur vulcanization of diene rubbers are often prepared in an aqueous medium, the product being in the form of an aqueous slurry. For various reasons slurries of powdery accelerators are often difficult to filter and the filtered or extruded product often difficult to dry. Aqueous slurries of powdery accelerators are normally filtered and the resultant filter cake passed through an extruder to form rodlike elements which are then deposited upon a drying surface where they are subsequently dried, sometimes in an air drying chamber. The rods are then either sold in rod form or ground and sold in granular form. One purpose of the extrusion step is to provide firm, smooth, rodlike elements which form an easy to dry porous bed when deposited upon a drying surface. In the case of powdery accelerators the extruded rodlike elements are often limp and mushy and therefore tend to lump together into a solid nonporous mass which is very difficult to dry. Economic factors demand that on a commercial basis, processing rates, such as filtration and drying rates, be as high as possible.

It is therefore an object of the present invention to improve the processibility of powdery zinc dialkyl dithiocarbamate accelerators prepared in an aqueous medium. It is also an object of the present invention to provide a method of improving the drying rates of moisture containing powdery zinc dialkyl dithiocarbamate accelerators which have been prepared in an aqueous medium. It is still another object of the present invention to provide a method of improving the filtration rate of aqueous slurries of powdery zinc dialkyl dithiocarbamate accelerators. Other objects and advantages will be apparent from the description of the invention which follows.

In accordance with the present invention at least one polymer latex is coagulated in an aqueous medium during the preparation, by a precipitation reaction, in the aqueous medium, of a powdery accelerator having the following structural formula

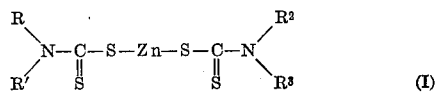

(I)

wherein R, R', R² and R³ are alkyl radicals having from 1 to 4 carbon atoms.

Preferably the reaction involves reacting at least one carbamate having the following structural formula:

(II)

wherein $R^4$ and $R^5$ are alkyl radicals having from 1 to 4 carbon atoms and wherein M is selected from the group consisting of sodium and potassium, with at least one zinc compound selected from the group consisting of zinc acetate, zinc bromide, zinc chloride, zinc fluoride, zinc iodide, zinc sulfate and zinc nitrate.

The zinc compounds include the hydrated as well as the anhydrous forms. Obviously when the identities of $R^4$ and $R^5$ are established the identities of R, R', $R^2$ and $R^3$ are also fixed.

Examples of carbamates conforming to structural Formula II are as follows:

sodium dimethyl dithiocarbamate
potassium dimethyl dithiocarbamate
sodium diethyl dithiocarbamate
sodium dibutyl dithiocarbamate
potassium diethyl dithiocarbamate
potassium dibutyl dithiocarbamate
sodium N-methyl, N-butyl dithiocarbamate Examples of zinc dialkyl dithiocarbamates conforming to structural Formula I are as follows:

zinc dimethyl dithiocarbamate
zinc diethyl dithiocarbamate
zinc dipropyl dithiocarbamate
zinc dibutyl dithiocarbamate
mixed zinc salt of dimethyl dithiocarbamic acid and diethyl dithiocarbamic acid
zinc diisopropyl dithiocarbamate
mixed zinc salt of dimethyldithiocarbamic acid and diisopropyl dithiocarbamic acid
mixed zinc salt of diethyl dithiocarbamic acid and diisopropyl dithiocarbamic acid In the practice of the present invention the latex is added to the aqueous medium prior to or during the preparation of the powdery accelertaor, i.e., at the start of the reaction or later on during the reaction. Only a nominal amount of agitation is required during the coagulation. The latex and a coagulant are not combined prior to the commencement of the reaction. Although the coagulation may take place sometime after the reaction has commenced, it is preferred that it begin approximately at the same time that the precipitation reaction begins.

In the practice of the present invention the coagulation of the polymer latex takes place under conventional coagulation conditions. Only a nominal amount of agitation is normally necessary and conventional polymer latex coagulants may be used. The choice of coagulant is dependent only on the type of emulsifier used to stabilize the latex. For example, if natural rubber latex is used, coagulants such as metallic salts, mineral acids and organic acids, such as formic and/or acetic acid, may be used. Where an anionic emulsifier such as a sodium salt of lauryl sulfate is used, aluminum sulfate, zinc sulfate and metallic salts having a positive valence of 2 or 3 may be used as the coagulant. Where a cationic emulsifier, such as lauryl pyridinium chloride is used as the emulsifier, an anionic emulsifier may be used as a coagulant. Where a nonionic emulsifier, such as a condensation product of etylene oxide and a phenol is used as the emulsifier, a coagulant such as acetone or ethanol may be used. The above examples are merely illustrative and not limiting as to the conventional emulsification systems and conventional coagulants which may be used.

The latex emulsifiers are used in conventional amounts, i.e., from about 2 to about 5 parts by weight per 100 parts by weight of the monomers charged in preparing the polymer.

In a preferred embodiment of the present invention the product is prepared as previously described herein by a reaction between the carbamate and the zinc compound, and the latex contains an anionic emulsifier or a cationic emulsifier, the polymer latex being combined with the carbamate prior to combining the carbamate and the zinc compound. The carbamate, zinc compound and latex can also be simultaneously combined, i.e., in a continuous reaction. Where the emulsifier is of an anionic or cationic type, the zinc compound will act as a coagulant as well as a reactant.

Examples of anionic surfactants that may be used are:

sodium lauryl sulfate
sodium dodecyl benzene sulfonate
ammonium xylene sulfonate
ammonium lauryl ether sulfate
sodium N-methyl-N-oleyl-taurate
potassium toluene sulfonate
sodium lauryl polyethoxy sulfate
sodium dihexyl sulfosuccinate Examples of cationic surfactants that may be used are:

cetyl dimethyl benzyl ammonium chloride
lauryl isoquinolinium saccharinate
diisobutyl cresoxy ethoxy ethyl dimethyl benzyl ammonium chloride
methyl polyethanol quaternary amine
cetyl trimethyl ammonium bromide
stearyl dimethylbenzyl ammonium chloride
oleyl imidazoline
lauryl trimethyl ammonium saccarinate In the embodiment involving a reaction between a carbamate and a zinc compound, as described earlier herein, the dithiocarbamate compound, in aqueous solution, is mixed with the latex normally by adding the latex to the aqueous solution of the dithiocarbamate. Due to the small amount of latex used it is usually impractical to add the carbamate solution to the latex. The aqueous carbamate/latex mixture is then normally added to the zinc compound which is in aqueous form. Conversely, the zinc compound can be added to the aqueous carbamate/latex mixture, although the former procedure is preferred. The precipitation is then carried out under the conditions which are well established in the prior art for reactions between acidic zinc compounds and dialkyl dithiocarbamate salts to produce zinc dialkyl dithiocarbamate reaction products. That is, reaction temperatures are from about 50 to about 75° C., reaction pressures are normally atmospheric pressure and molar ratios of the carbamate to the zinc compound are normally about 0.5:1. The present invention, however, is not limited by these conditions. As in prior art processes, slurry temperature has an effect on the processibility of accelerators prepared in accordance with the process of the present invention. Therefore, slurry temperatures should be considered when attempting to obtain optimum results. A wetting agent may be added to the carbamate solution, the latex or the carbamate/latex mixture. The zinc compound, in addition to reacting with the carbamate to form the zinc dialkyl dithiocarbamate, also acts to coagulate the polymer latex. This permits the aqueous zinc dialkyl dithiocarbamate slurry to be filtered at a much higher rate to form a filter cake containing a satisfactory moisture content. The improved moisture content of the filter cake permits the filter cake to be extruded into firm, smooth, rodlike elements, which form a porous, easy to dry, drying bed, thereby improving the drying rate and the overall processing rate. Therefore the present process improves both the filtration rate of aqueous slurries of powdery zinc dialkyl dithiocarbamates according to structural Formula I and the drying rate of these compounds.

Wetting agents, i.e., those materials which reduce the surface tension or interfacial tension between a solid and a liquid, can be used for various reasons in practicing the present invention. A wetting agent may be added to the reaction mixture or one of the reactants or the latex itself before the precipitation reaction commences. For example, by adding a wetting agent to the carbamate solution or latex before the commencement of a precipitation reaction to produce a zinc dialkyl dithiocarbamate, the formation of latex curds, which can clog lines and build up in reactors, may be avoided. Also, the addition of a wetting agent at this point results in a more uniform distribution of the latex. Powdery accelerator particles often tend to float in aqueous slurries. This leads to pumping and filtration difficulties. The addition of a wetting agent to the slurry reduces the surface tension, resulting in a uniform slurry which is easier to pump and filter. Examples of wetting agents are as follows:

octyl phenoxy polyethoxy ethanol (9–10 mols ethylene oxide)
octyl phenoxy polyethoxy ethanol (5 mols ethylene oxide)
tertiary amines/ethylene oxide condensation products of the primary fatty amines (5 mols ethylene oxide)
ethylene oxide condensation products of Duomeen T (3 mols ethylene oxide)
polyoxyethylene alkyl amine
ethoxylated nonyl phenol (9 mols ethylene oxide)
nonyl phenol poly(ethyleneoxyl) ethanol (9–10 mols ethylene oxide)
nonyl phenol poly(ethyleneoxyl) ethanol (6 mols ethylene oxide)

It is well known that some wetting agents can interfere with latex coagulation, depending on the emulsification system being used. Such factors should naturally be considered when selecting wetting agents for a particular latex.

Although virtually any polymer latex, including latices of polystyrene and polyvinyl chloride, may be used, rubber latices are preferred, particularly those prepared from conjugated dienes. The polymer latices include latices of natural rubber and synthetic latices normally prepared by emulsion polymerization, either hot or cold. Examples of emulsion polymer latices are latices of polybutadiene, polyisoprene and copolymers of butadiene or isoprene with monoolefins such as styrene, acrylonitrile or methyl methacrylate. The latex may possess a polymer solids content of from about 1 percent, and lower, to about 70 percent. Preferably the solids content of the latex is from about 20 to about 60 percent. Most preferred is a solids content from about 30 to about 40 percent.

The ratio of the polymer portion of the latex to the accelerator product after the precipitation reaction is complete is from about 0.5 part to about 10 parts by weight per 100 parts by weight of the accelerator product. Preferably the amount of polymer is from about 0.5 to about 2.5 parts, and most preferably from about 1.0 to about 1.5 parts by weight. Although even higher levels of polymer may be used, i.e., greater than 10 parts, such levels are undesirable from an economic standpoint and unnecessary from a processibility standpoint.

The method of the present invention will improve processibility rates whether the processing steps, that is, filtration, extrusion and drying, are run continuously or batchwise. The method of the present invention is also effective whether the precipitation reaction, for example, the reaction between a carbamate and a zinc compound is run batchwise or continuously. The addition of the latex and the coagulant may also be batchwise or continuous.

The concentration of the powdery accelerator in the aqueous slurry after the precipitation reaction is complete may vary from about 1 part of powdery accelerator per 100 parts by weight of water to about 20 parts by weight of accelerator per 100 parts by weight of water. Preferably the amount of accelerator is from about 4 parts to about 16 parts and most preferably from about 10 parts to about 14 parts.

The following examples include an example (Example 2) of a process within the practice of the present invention and, for comparison purposes, an example (Example 1) of a process outside the scope of the present invention.

The former example is intended to be illustrative of the invention and not a limitation thereof.

EXAMPLE 1

Zinc dimethyl dithiocarbamate—filtering, extrusion and drying with latex

Two aqueous solutions of sodium dimethyl dithiocarbamate were treated essentially as follows. Five gallons of an aqueous 6 percent Triton X–100 solution, octyl phenoxy polyethoxy ethanol (9 to 10 ethylene oxides) were added to each solution. This was followed by the addition and dispersion therein of 47 pounds of a hot 75/25 butadiene/styrene latex containing 35 percent solids. As an emulsifier, the latex contained an anionic surfactant, sodium linear dodecyl benzene sulfonate in an amount of about 3.8 to 3.9 parts per 100 parts by weight of polymer. The two aqueous solutions of sodium dimethyl dithiocarbamate, after the addition of wetting agent and latex, amounted to a total of about 13,060 pounds of a 20 percent solution of the carbamate.

Water (600 gallons) was charged to a precipitation tank. Sulfuric acid, 95 percent (23 pounds) was added to the water. Zinc sulfate monohydrate (1650 pounds; 9.2 mols) was then added to the precipitation tank and the solution heated to 70° C. The sulfuric acid was added to convert any zinc hydroxide present in the zinc sulfate to zinc sulfate. The sodium dimethyl dithiocarbamate solutions were added to the agitated zinc sulfate solution at a rate of 15 gallons per minute while maintaining the precipitation temperature at 70° C. When all of the carbamate solution had been added the batch was checked for completeness of precipitation and adjusted with either carbamate solution or zinc sulfate to leave no excess carbamate or zinc sulfate. The slurry had a solids content of approximately 14 percent. An additional 23 pounds of sulfuric acid (95 percent) were added. A rubber processing oil (6.5 gallons) was added, followed by the addition of 4.5 pounds of Ethomeen T/15, tertiary amines/ethylene oxide condensation products of the primary fatty amines (5 mols ethylene oxide).

The zinc dimethyl dithiocarbamate slurry was continuously filtered and washed using a rotary belt type vacuum filter. The filter cake contained 44 to 47 percent moisture. The filter cake was dropped into a National Drying Machinery Eccentric Rotor Extruder which preformed the filter cake into firm, smooth rodlike elements which were deposited on a continuous dryer with a perforated apron to form a dryer bed approximately 5 inches deep. The resulting dryer bed was porous, having an open network which allowed uniform passage of hot air through the bed, thereby resulting in increased drying rates. Processing rates of 1050 pounds per hour across the filter, extruder and dryer were measured. Rates of 1300 pounds per hour were estimated, based on a visual observation of the dryer bed depth. For a 24 hour period a rate of 833 pounds per hour was obtained. The drying temperature was 220° F. The dried preforms were easily ground. The dried product moisture content was 0.06 percent. The rubber hydrocarbon content of the accelerator was about 1.2 percent. Although the sulfuric acid may have aided in the coagulation of the polymer latex, the zinc sulfate played a large part in the coagulation. Essentially the same results will be obtained in the above example when no sulfuric acid is added to convert the zinc hydroxide present to zinc sulfate.

EXAMPLE 2

The sodium dimethyl dithiocarbamate preparation, the precipitation and processing are carried out as described in Example 1 with the exception that no latex is added. The filter cake is extruded into preforms which are subsequently deposited on the dryer apron. The preforms are wet and mushy. The resulting dryer bed is nonporous to air because of the tendency for the preforms to mat together, forming a solid mass. The overall processing rate is significantly lower than those obtained using the process described in Example 1.

While certain representative embodiments and details have been shown for the purpose of illustrating the invention it will be apparent to those skilled in this art that various changes and modifications may be made therein without departing from the spirit or scope of the invention.

What I claim is:

1. A method of improving the processibility of powdery accelerators having the structural formula:

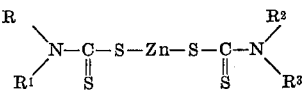

wherein R, R¹, R² and R³ are alkyl radicals having from 1 to 4 carbon atoms, prepared by a precipitation reaction in an aqueous medium, comprising reacting at least one carbamate having the following structural formula:

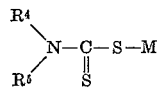

wherein R⁴ and R⁵ are alkyl radicals having from 1 to 4 carbon atoms and wherein M is selected from the group consisting of sodium and potassium, with at least one zinc compound selected from the group consisting of zinc acetate, zinc bromide, zinc chloride, zinc fluoride, zinc iodide, zinc sulfate and zinc nitrate, wherein at least one rubber latex is added to the carbamate prior to combining the carbamate with the zinc compound or wherein the carbamate, zinc compound and at least one rubber latex are combined simultaneously.

2. A method of improving the processibility of a powdery accelerator having the following structural formula:

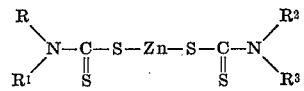

wherein R, R¹, R² and R³ are alkyl radicals having from 1 to 4 carbon atoms and prepared by a precipitation reaction comprising combining at least one carbamate having the following structural formula:

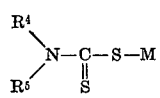

wherein R⁴ and R⁵ are alkyl radicals having from 1 to 4 carbon atoms and wherein M is selected from the group consisting of sodium and potassium with at least one zinc compound selected from the group consisting of zinc acetate, zinc bromide, zinc chloride, zinc fluoride, zinc iodide, zinc sulfate and zinc nitrate, said precipitation reaction taking place in an aqueous medium, comprising adding at least one rubber latex, stabilized with at least one emulsifier selected from the group consisting of anionic emulsifiers and cationic emulsifiers, to the carbamate prior to combining the carbamate with the zinc compound, wherein the solids content of the latex is from 1 percent to 70 percent, wherein the amount of latex is sufficient to provide from 0.5 part by weight to 10 parts by weight of rubber per 100 parts by weight of the accelerator product after the precipitation is complete, and wherein the concentration of the accelerator in the aqueous medium after the precipitation is complete is from 1 part by weight to 20 parts by weight per 100 parts by weight of water in the aqueous medium.

3. A method of improving the processibility of a powdery accelerator having the following structural formula:

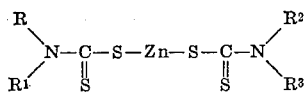

wherein R, R¹, R² and R³ are alkyl radicals having from 1 to 4 carbon atoms and prepared by a precipitation reaction comprising combining at least one carbamate having the following structural formula:

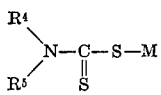

wherein R⁴ and R⁵ are alkyl radicals having from 1 to 4 carbon atoms and wherein M is selected from the group consisting of sodium and potassium, with at least one zinc compound selected from the group consisting of zinc acetate, zinc bromide, zinc chloride, zinc fluoride, zinc iodide, zinc sulfate and zinc nitrate, said precipitation reaction taking place in an aqueous medium, comprising simultaneously combining the carbamate, the zinc compound and at least one rubber latex stabilized with at least one emulsifier selected from the group consisting of anionic emulsifier and cationic emulsifiers, wherein the solids content of the latex is from 1 percent to 70 percent, wherein the amount of latex is sufficient to provide from 0.5 part by weight to 10 parts by weight of rubber per 100 parts by weight of the accelerator product after the precipitation is complete, and wherein the concentration of the accelerator in the aqueous medium after the precipitation is complete is from 1 part by weight to 20 parts by weight per 100 parts by weight of water in the aqueous medium.

4. The method according to claim 1 wherein the solids content of the latex is from 20 percent to 60 percent, wherein the amount of latex is sufficient to provide from 0.5 part by weight to 2.5 parts by weight of rubber per 100 parts by weight of the accelerator product after the precipitation is complete, and wherein the concentration of the accelerator in the aqueous medium after the precipitation is complete is from 4 parts by weight to 16 parts by weight per 100 parts by weight of water in the aqueous medium.

5. The method according to claim 6 wherein the solids content of the latex is from 30 percent to 40 percent, wherein the amount of latex is sufficient to provide from 1.0 part by weight to 1.5 parts by weight of rubber per 100 parts by weight of the accelerator product after the precipitation is complete, wherein the concentration of the accelerator in the aqueous medium after the precipitation is complete is from 10 parts by weight to 14 parts by weight per 100 parts by weight of water in the aqueous medium and wherein the accelerator is selected from the group consisting of zinc dimethyl dithiocarbamate and zinc diethyl dithiocarbamate.

References Cited
UNITED STATES PATENTS

| | | | |
|---|---|---|---|
| 2,640,088 | 5/1953 | Glenn et al. | 260—793 X |
| 2,888,443 | 5/1959 | Hayes et al. | 260—793 X |
| 2,888,444 | 5/1959 | Roberts et al. | 260—793 X |
| 2,921,931 | 1/1960 | Hayes | 260—793 X |

JOSEPH L. SCHOFER, Primary Examiner

W. F. HAMROCK, Assistant Examiner

U.S. Cl. X.R.

260—79.5 B, 85.1, 94.7 S, 793, 429.9